(12) United States Patent
Nickence et al.

(10) Patent No.: US 7,320,526 B2
(45) Date of Patent: Jan. 22, 2008

(54) PORTABLE WIDE-VIEW MIRROR FOR BLIND-SIDE BACKING OF A SEMI-TRACTOR TRAILER

(76) Inventors: Louis Nickence, 14401 W. County Rd. K, Hayward, WI (US) 54843; Donald Gokey, Sr., Box 13281, Hayward, WI (US) 54843

(*) Notice: Subject to any disclaimer, the term of this patent is extended or adjusted under 35 U.S.C. 154(b) by 127 days.

(21) Appl. No.: 10/904,451

(22) Filed: Nov. 10, 2004

(65) Prior Publication Data

US 2006/0098310 A1    May 11, 2006

(51) Int. Cl.
*A47G 1/02* (2006.01)
*B60R 1/08* (2006.01)
(52) U.S. Cl. .................. 359/844; 359/872; 248/472; 248/480
(58) Field of Classification Search ............... 359/841, 359/843, 844, 871, 872, 876; 248/466, 472
See application file for complete search history.

(56) References Cited

U.S. PATENT DOCUMENTS

| | | | | |
|---|---|---|---|---|
| 1,894,233 A | * | 1/1933 | Ellis | 248/480 |
| 2,039,474 A | * | 5/1936 | Brunette | 359/726 |
| 2,623,435 A | * | 12/1952 | Geis | 108/3 |
| 3,123,041 A | * | 3/1964 | Gunderson | 248/472 |
| 3,377,117 A | * | 4/1968 | Biscow | 359/549 |
| 3,846,016 A | * | 11/1974 | Firstenberg | 359/602 |
| 4,394,065 A | * | 7/1983 | Swanson | 359/844 |
| 4,624,499 A | * | 11/1986 | Flowerday | 296/97.5 |
| 4,624,539 A | * | 11/1986 | King et al. | 359/872 |
| 4,824,159 A | * | 4/1989 | Fluharty et al. | 362/492 |
| 5,576,898 A | * | 11/1996 | Rubin | 359/841 |
| 6,808,278 B1 | * | 10/2004 | Jirnov | 359/879 |

* cited by examiner

*Primary Examiner*—Alessandro Amari
*Assistant Examiner*—Mark Consilvio
(74) *Attorney, Agent, or Firm*—Rudy Law Firm; William T. Helwig

(57) ABSTRACT

A portable wide-view mirror apparatus that allows a driver to see the rear half of the right blind-side of a trailer and right-side obstacles during a right blind-side backing maneuver. Generally, a notebook-like design wherein the mirror opens up from the attached base for use. The mirror is placed on the passenger side of the dashboard inside the passenger compartment of the vehicle, is positioned by the driver at the beginning of the backing maneuver to provide a wide rearward view out the passenger side window, and is adjusted when necessary by the driver during the backing maneuver. The mirror is folded down when not in use. The portable mirror is especially useful to the commercial truck driver as an aid in the right blind-side backing maneuver of a semi-tractor trailer. In the event the driver changes trucks, the driver retains the portable mirror for use in the new truck.

5 Claims, 4 Drawing Sheets

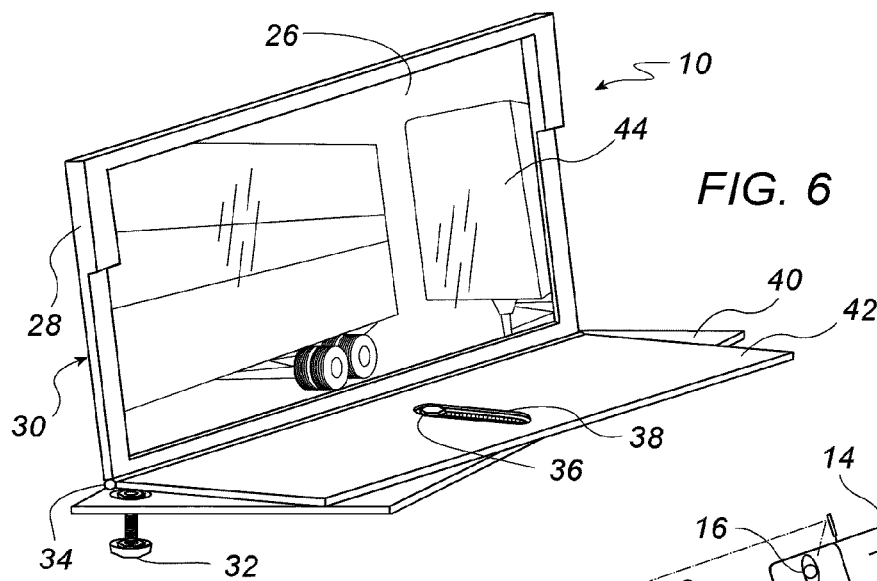
FIG. 6
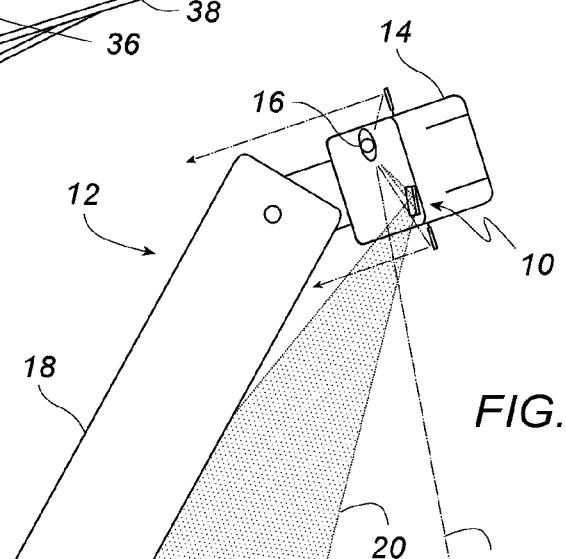
FIG. 7
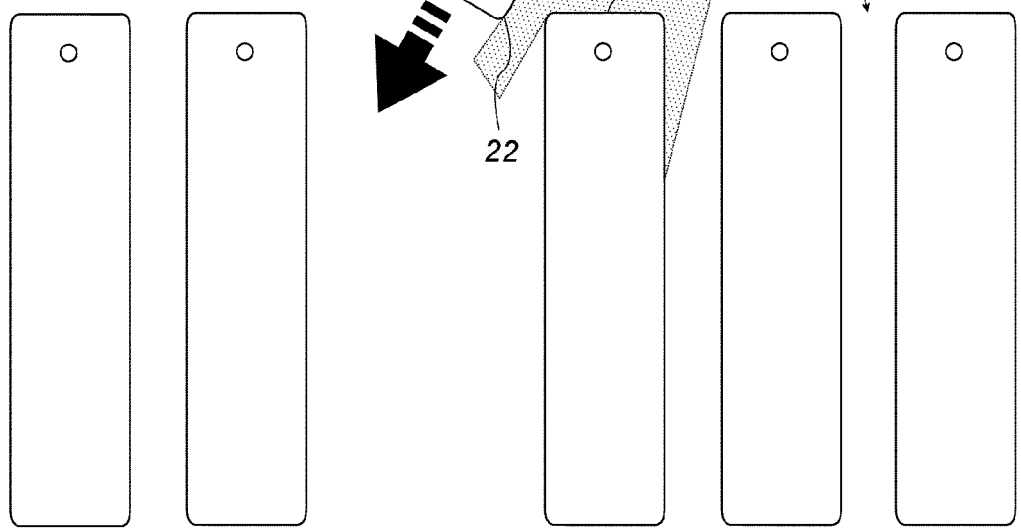

PORTABLE WIDE-VIEW MIRROR FOR BLIND-SIDE BACKING OF A SEMI-TRACTOR TRAILER

BACKGROUND OF THE INVENTION

The present invention relates in general to a portable wide-view mirror apparatus for right blind-side backing of a vehicle with an attached trailer, and in particular to a portable wide-view mirror apparatus for right blind-side backing of a semi-tractor trailer unit.

Mirrors are used to help a driver back a trailer in nearly all situations. Mirrors assist the driver by allowing the driver to see blind spots which the driver cannot see by looking rearward from the drivers seat out either the drivers side window, the passenger side window or other rear windows if present and offering an unobstructed rearward view.

Backing maneuvers with a trailer can be time consuming and dangerous. This is most particularly true in a right-side backing maneuver when the right side mirror's view becomes blocked by the turning trailer and no longer provides visual assistance in backing. The period of right-side backing which takes place from the time the trailer begins blocking the right-side mirror and while the right rear of the trailer remains out of the driver's view from any mirror or window, is known as a right "blind-side" backing maneuver.

Left-hand backing maneuvers are not typically considered blind-side backing maneuvers for most vehicles because even when the trailer turns at an angle which blocks the left side mirror, the driver need only turn his head and look out of the left side window for a rearward view to complete the backing maneuver. This allows the driver to see the left rear side of the trailer for the entire maneuver by using the left-hand mirror and driver's side window.

Interior rear view mirrors may be used in most passenger vehicles to help prevent right blind-side backing, but they cannot be used in instances where the rear window of the vehicle is obstructed or non-existent. Semi-tractor trailer units are an example of vehicles which are expected to have an obstructed rear view, and which therefore do not come equipped with interior rear view mirrors, and are not equipped to prevent blind-side backing.

For right blind-side backing maneuvers, where the driver is without the help of some type of blind-side backing equipment, the driver then is required to get out of the truck and check the progress frequently. In a moderate to tight right blind-side backing maneuver the driver may need to get out of the truck every few feet and walk around to the right side of the truck to view his progress, then decide what, if any, corrections need to be made, walk back around the truck, climb back into the cab, back up a few more feet and then stop, climb back out, and check on his progress again. This can turn what would be a simple parking maneuver, with the appropriate visual feedback, into a stressful, risky and time consuming ordeal. An alternative method has a second person stand on the right side of the truck where the driver can see that second person, and the second person relays information on the backing procedure to the driver. Under this circumstance the driver must rely on the accuracy of the information being relayed to him by the person directing him, since he has no visual feedback of his own, and this can again be a risky proposition for the driver.

Numerous patents have been developed to aid a driver in a right blind-side backing maneuver. Some prior art allows the exterior passenger-side mirror to be manually adjusted to keep the right rear corner of the trailer in view. The driver must still stop often, leaving the driver's seat to readjust the exterior mirror, which is still time consuming, but he does not then need to rely on another person to direct him. Some prior art allows the exterior passenger-side mirror to automatically position itself so the driver can see the rear corner of the trailer and obstacles continuously during right blind-side backing maneuvers. These systems are fairly expensive and must be installed onto the semi-tractor. They also do not provide a wide-angle view of the entire rear half of the right side of the trailer, due to their distance from the driver and practical limitations on the width of exterior side-view mirrors. None of the prior art is portable. None of the prior art uses an interior dash mounted mirror system which is within reach and thereby directly and easily adjusted by the driver while remaining in his seat. None of the prior art is inexpensive enough to allow the equipment to be purchased and used by the driver, who is ultimately responsible for safe backing procedures. Most of the prior art depends on investment by the trucking company to modify their trucks and equipment to employ the prior art mirrors or blind side backing equipment.

U.S. Pat. No. 4,253,738 issued Mar. 3, 1981 to Linkous is an exterior mounted manually adjustable mirror apparatus to assist tractor-trailer drivers in backing maneuvers. This mirror apparatus cannot be adjusted from the driver's seat. This mirror apparatus is not portable and is designed to replace the original equipment semi-truck mirror, making it impracticable for a commercial truck driver that is not an owner-operator.

U.S. Pat. No. 5,479,297 issued Dec. 26, 1992 to Summers is an exterior mounted self-positioning mirror apparatus complete with an electrical system to allow repositioning the mirror during right-hand backing procedures. It is not portable and is also designed to replace the truck OEM semi-truck mirror, making it impracticable for a pick-up truck owner or a commercial truck driver that is not an owner-operator.

U.S. Pat. No. 5,052,792 issued Oct. 1, 1991 to McDonough includes an exterior fixed and moveable mirror. The moving mirror moves on a signal from the blinker switch. This mirror is not portable and would also replace the existing OEM mirror and would need to be tied into the truck electrical system. This level of complication makes it impracticable to be owned and used by a commercial driver.

U.S. Pat. No. 6,693,519 issued Feb. 17, 2004 to Kierstead uses a video camera mounted to the exterior of the cab and a video monitor mounted on the dashboard to allow the driver to view blind spots on the right side of the trailer for general driving. This system will also provide assistance in blind-side backing maneuvers. This vehicle monitoring system is not portable and would appear to be quite expensive. It will also not provide as large or clear of a view as a wide direct reflecting mirror.

Most trucking companies don't use any of the prior art devices for one or more reasons. New trucks are either bought or leased and self-positioning mirrors for blind-side backing do not come as standard equipment due to excess additional cost.

Another industry feature that makes the blind-side mirror a higher priority item for the driver than the trucking company is the manner in which loads are picked up and delivered. Trucking companies make money when loads are delivered on time and without incident. The driver makes money when the truck is moving down the road. Trucking companies will sometimes pay the driver a flat fee for picking up or dropping off a trailer. The fee doesn't change for drops that take five minutes or thirty minutes. As long as the load is on time, the company earns the contracted amount of money blind-side backing maneuvers that take longer because the driver must continually get out of the truck to see the trailer and obstacles, cuts into the earning potential of the driver more than the trucking company. Therefore, making safe and quick blind-side backing maneuvers is a much higher priority for the driver than it is for the trucking companies.

What is needed then, is a blind-side backing apparatus which is simple and easy to use from within the passenger compartment, which allows the driver to quickly and efficiently perform a right blind-side backing maneuver, which is portable so that the driver may easily move it from vehicle to vehicle, and which is inexpensive enough that the individual commercial truck driver can afford to own it for use in whatever truck or trucks he must drive on a given day, and so that trucking companies can afford to purchase them on a fleet wide basis.

SUMMARY OF THE INVENTION

It is an object of the present invention to provide a mirror apparatus and method for right blind-side backing of a trailer which allows a driver to quickly and efficiently perform a solo right blind-side backing maneuver in a timely and cost effective manner.

It is another object of the present invention to provide a mirror apparatus for right blind-side backing of a trailer which provides a wide-angle rearward view out of the passenger side window when properly positioned within the passenger compartment of a vehicle.

It is a further object of the present invention to provide a mirror apparatus for right blind-side backing of a trailer which provides a view of the rear half of the right blind-side of a trailer when properly positioned within the passenger compartment of a vehicle.

It is another object of the present invention to provide a mirror apparatus for right blind-side backing of a trailer which is within the driver's reach and can be easily adjusted if necessary by the driver at any time while backing and does not require the driver to leave his seat during the backing maneuver.

It is a further object of the present invention to provide a mirror apparatus for right blind-side backing of a trailer which is portable.

It is another object of the present invention to provide a mirror apparatus for right blind-side backing of a trailer which is inexpensive compared to prior art.

It is yet a further object of the present invention to provide a mirror apparatus for right blind-side backing of a trailer which can be quickly closed and out of the way of the driver when not in use.

These and other objects and advantages of the present invention are realized in one embodiment of a portable wide-view mirror apparatus for right blind-side backing of a semi-tractor trailer, comprising a viewing mirror, a mirror frame to which said mirror is attached, a friction type of hinge, a base which is attached from its rear edge to said mirror frame's bottom edge by said friction hinge, and a lower base upon which the upper base and supported mirror and frame may pivot and also slide forwards and backwards, and which includes a pair of removable, adjustable legs near the bottom rear corners. Generally a notebook-like design wherein the mirror opens up from the attached base for use, and when placed upon the passenger side of the dashboard, may be pivoted to display to the driver a wide rearward view out the passenger side window, which during a right blind-side backing maneuver displays the rear half of the right blind-side of the trailer.

Other objects and features of the invention will become clear upon a reading of the Detailed Description.

BRIEF DESCRIPTION OF THE DRAWINGS

The present invention may be understood from the description of the embodiment which follows and from the accompanying drawings. The drawings are hereby expressly made a part of the specification.

FIG. 6 is an isometric view of the portable wide-view mirror apparatus depicted in FIG. 2, with the mirror apparatus in a pivoted position on its lower base, and displaying the driver' rearward view for the right-hand backing maneuver being performed in FIG. 7.

FIG. 7 is an aerial view of a semi-tractor trailer unit performing a right "blind-side backing maneuver into an open spot in a row of parked semi-trailers in tight quarters.

DETAILED DESCRIPTION

Figure 1A:
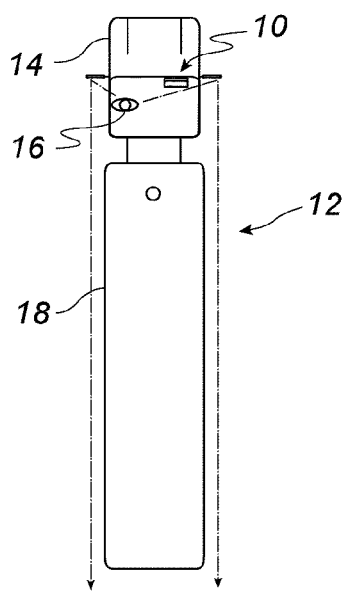
FIG. 1A is an aerial view of a semi-tractor trailer unit prior to beginning a right blind-side backing maneuver.
Figure 1B:
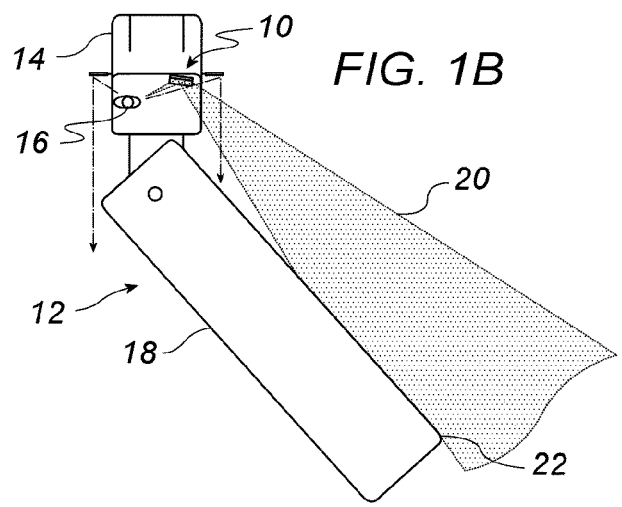
FIG. 1B is an overhead view of a semi-tractor trailer unit in a medium radius right blind-side backing maneuver.

Reference is made herein to the attached drawings. Like reference numerals are used throughout the various drawings to depict like or similar elements of the claimed mirror apparatus. For the purpose of presenting a brief and clear discussion of the mirror apparatus, the preferred embodiment will be discussed in conjunction with a semi-tractor trailer unit. This is for representative purposes only and should not be construed as limiting in any manner.

Figure 1C:
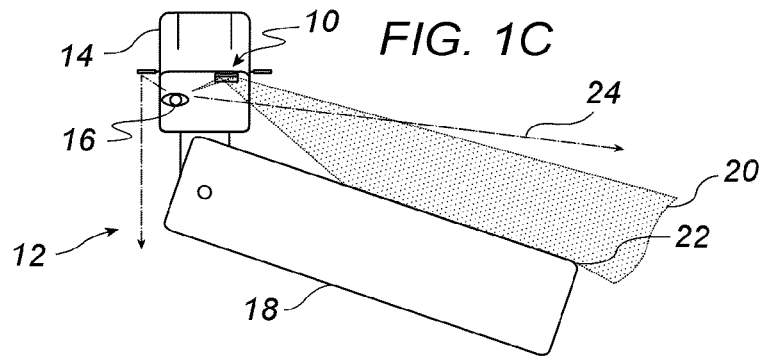
FIG. 1C is an overhead view of a semi-tractor trailer unit in a tight radius right blind-side backing maneuver.
Figure 1D:
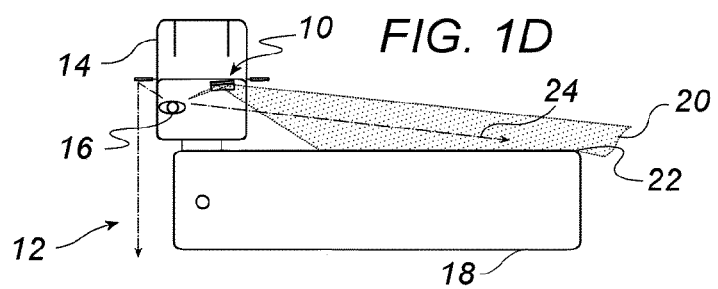
FIG. 1D is an overhead view of a semi-tractor trailer unit in a very tight radius (ninety degree) right blind-side backing maneuver.

FIGS. 1A through 1D depict a semi-tractor trailer unit 12 as it progresses through a right-hand backing maneuver. Dashed lines coming from the exterior side-view mirrors of the semi-tractor 14 depict the line of sight of the driver 16 of the semi-tractor trailer unit 12 as he or she looks at the mirrors. As is clearly shown in FIG. 1B, once the angle between the tractor 14 and trailer 18 reaches a minimal angle beyond a straight line, the fixed exterior right side-view mirror only reflects a view of the front side of the semi-trailer 18 to the driver 16. Dashed line 24 in FIGS. 1C and 1D depicts the driver's direct view out the passenger side window during the right-hand backing maneuver, and clearly shows that the driver 16 has no direct view of the rear half of the right side of the trailer 18 until a very tight radius is reached, at which point only the right rear corner 22 of the trailer comes into view. The present invention, the portable wide-view mirror apparatus 10, is shown in use on the passenger side of the dashboard, where it is easily adjusted to provide a clear view of the rear half of the right-side of the trailer 18, and in particular, the right rear corner of the trailer 22, and any obstacles the trailer might be approaching. Dotted lines coming from the mirror apparatus 10, enclose a shaded area 20 depicting the angle of rearward view coverage provided by the mirror apparatus. As is clearly shown in FIGS. 1B, 1C and 1D, at any angle during a right-hand backing maneuver the entire rear half of the right side of the trailer 18 is kept in full view by simply pivoting the mirror apparatus 10 as the turn gets progressively tighter, without the driver 16 ever being required to leave his seat. As noted above, the present invention is particularly useful in a semi-tractor trailer unit, but may be used in any type of motor vehicle.

Figure 2:
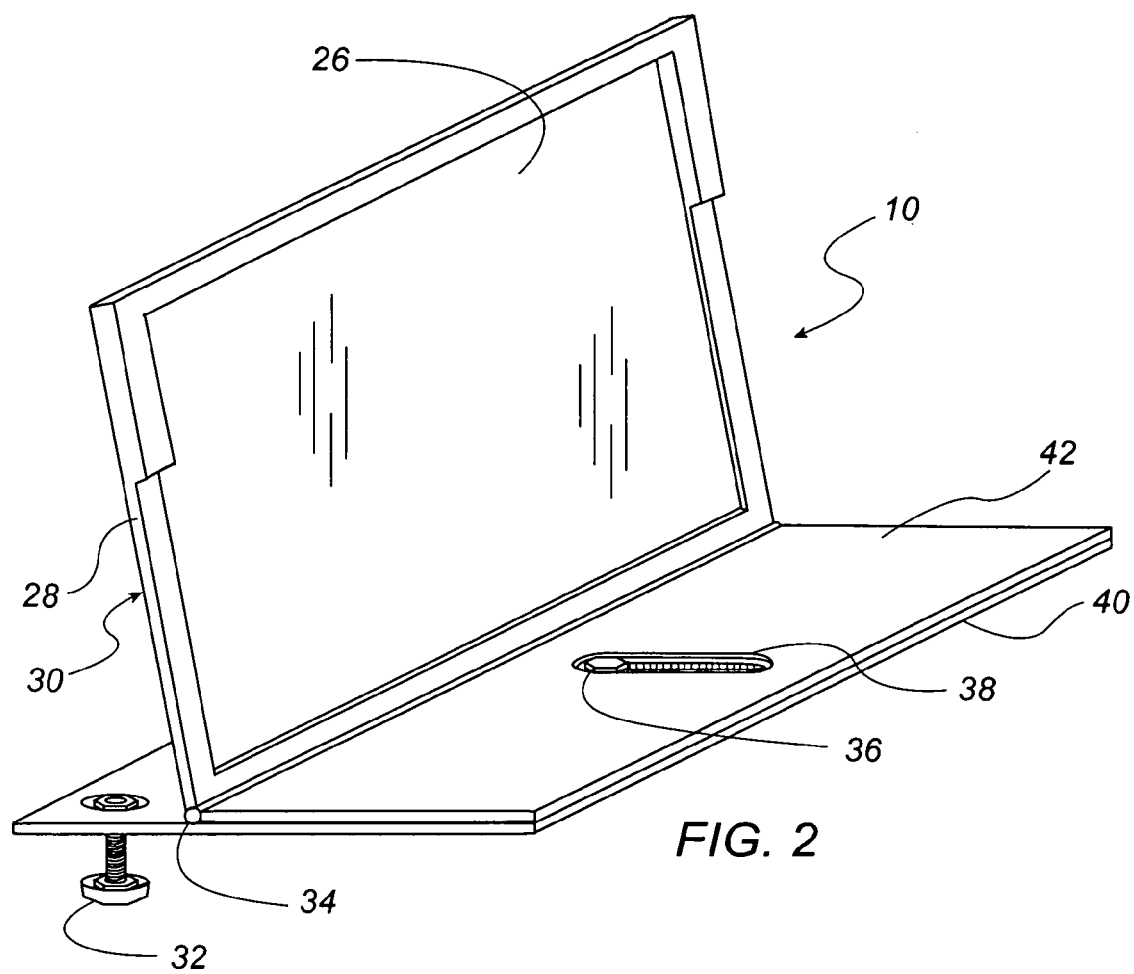
FIG. 2 is an isometric view of the portable wide-view mirror apparatus, as it would look from the driver's seat if the mirror was opened up into the viewing position and the mirror panel and upper base were slid forward into the on-dash position and the mirror apparatus was placed on the dash in front of the passenger seat.
Figure 3:
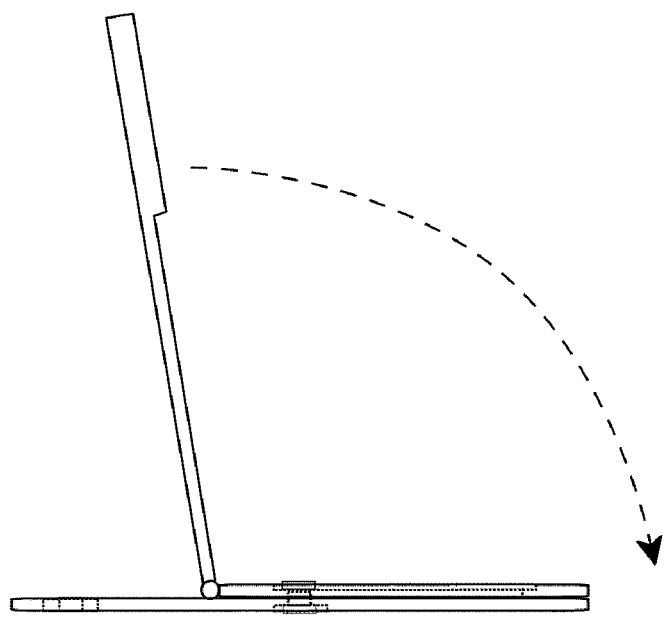
FIG. 3 is a side view of the mirror apparatus depicted in FIG. 2, with the mirror panel opened up into the viewing position and with the mirror panel and upper base slid forward into the on-dash position for use by the driver.
Figure 4:
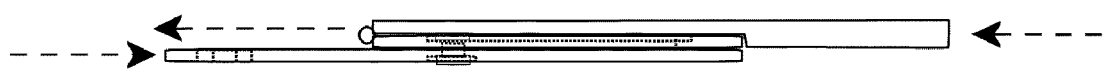
FIG. 4 is a side view of the mirror apparatus depicted in FIG. 2, after the mirror panel has been folded down into the on-dash position, but before the mirror panel and upper base have been slid backward into alignment with the lower base for storage.
Figure 5:
FIG. 5 is a side view of the mirror apparatus depicted in FIG. 2, with the mirror panel folded down and with the mirror panel and upper base slid backwards into the storage or travel position.

Referring now to FIG. 2, the preferred embodiment 10 of the mirror apparatus, includes a planar viewing mirror 26 and a mirror frame 28 which has on its front surface a recessed inner surface sized to accommodate the viewing mirror 26 and within which said viewing mirror 26 is affixed. The outer edge of the mirror frame 28 surrounds the outer edge of the viewing mirror 26. This embodiment has a flush fit and smooth surface between the viewing mirror 26 and the mirror frame 28 for the lower approximate two-thirds of the mirror frame 28. The upper one-third of the mirror frame 28 extends outward beyond the surface of the viewing mirror 26 providing for overlap of the upper base 42 when folded down, as shown in FIGS. 3, 4 and 5, and is sized accordingly. The purpose of the mirror frame 28 is to provide support and protection to the viewing mirror 26 and to provide a rigid platform for securing the viewing mirror 26. The mirror frame 28 will be constructed of a material that is both light and inexpensive to satisfy the objectives of the invention. Example construction materials include but are not limited to low-density polyethylene or aluminum sheeting. The mirror frame 28 and attached viewing mirror 26 comprise the mirror panel 30.

The mirror panel 30 is attached to the upper base 42, by a hinge 34 attached along the upper base's rear edge and attached to the bottom edge of the mirror panel 30. This is a friction type hinge that can hold the mirror panel 30 securely in any position in which the mirror panel 30 can rotate about the hinge 34. The hinge 34 allows the driver to lift and lower the mirror panel 30 by holding the base with one hand and rotating the mirror panel 30 up with the other hand to expose and use the viewing mirror 26. Opening the mirror apparatus 10 in this manner is similar to opening the cover on a book or the cover on a laptop computer. The hinge 34 allows the mirror panel 30 to be folded down flat onto the upper base 42 for storage when not in use. The hinge 34 does not need lubrication and is maintenance free for the life of the mirror apparatus 10. Side mount or other type hinges which allow for rotation of the mirror panel 30 from a closed position into an upright viewing position over the base may also be used.

The upper base 42 is attached to the lower base 40 by a centrally located pivot bolt 36 which extends through a pivot groove 38 in the upper base 42 and screws into and is affixed to the lower base 40. The pivot groove 38 extends from interior of the front edge to interior of the rear edge of the upper base 42, and is centrally located between the left and right side edges of the upper base 42. The pivot bolt 36 is a simple bolt type fastener which allows the upper base 42 and attached mirror panel 30 to pivot around the pivot bolt 36 in a circular manner over the lower base 40 while providing enough tension so that the mirror panel 30 will hold its position once it is pivoted into place. The pivot attachment of the upper base 42 to the lower base 40 allows for adjustment by the driver of the viewing angle while backing. The pivot groove 38 allows the upper base 42 and attached mirror panel 30 to slide forwards and backwards past the pivot bolt 36 for the length of pivot groove 38 in a linear manner over the lower base. The sliding attachment of the upper base 42 to the lower base 40 allows the upper base 42 and attached mirror panel 30 to slide forward when it is necessary to provide clearance for sloping windshields, while allowing the lower base 40 to remain securely positioned on the dashboard.

The lower base 40 has attached from its bottom surface threaded adjustable leveling legs 32 which screw into the lower base near each rear corner. The purpose of the adjustable leveling legs 32 is to provide a level foundation on an uneven or forward sloping dashboard. For level or rearward sloping dashboards, it is not necessary or desirable to use the adjustable leveling legs 32, and they may be removed from the lower base 40. Other types of leveling legs may also be used, including flip-down leveling legs which may be recessed into the bottom surface of lower base 40.

The upper base 42 and lower base 40 will be constructed of a material that is both light and inexpensive, however, they should be more heavily constructed than the mirror frame 28 to provide an appropriate counterbalance and added stability for the mirror panel 30 when in the open position. Example construction materials include but are not limited to low-density polyethylene or aluminum sheeting which may be weighted down when required. The upper base 42 and lower base 40 may also be made entirely from another suitable and appropriately dense material. The leveling legs 32 will be made of a hardened tarnish resistant, inexpensive material, with a rubberized surface on the foot end.

The bottom surface of the lower base 40 is constructed of a rubberized like material which allows a friction contact with the dashboard surface and prevents unwanted sliding of the mirror apparatus 10 while in use. The bottom surface of the lower base 40 and the top surface of the dashboard may also have attached to them a hook-loop fastening velcro type material to allow quick attachment and removal of the mirror apparatus 12 from the dashboard, and to provide a more secure attachment to ensure the prevention of unwanted movement of the mirror apparatus 10 while in use.

The mirror panel 30 is sized to provide the driver with a wide-angle view of the rear half of the right blind-side of the trailer, when the mirror apparatus is positioned on the passenger side of the dashboard and directed to reflect a rearward view out the passenger side window. In general, the mirror panel's 30 width will be one and one-half to two times its height, to provide the necessary wide-angle view, and, in general, the mirror panel's 30 height will be one-quarter to one-half the height of the windshield above the dashboard. For example, the approximate dimensions for a mirror apparatus which would be ideal for certain Kenworth truck-tractor dashboards is a mirror panel 30 which is seven inches tall and sixteen inches wide, hingedly attached to an upper base which is sixteen inches wide and four and one-half inches deep, which is pivotally and slide-ably attached to a lower base which is sixteen inches wide and seven inches deep. These dimensions provide for an upper base 42 whose depth is approximately two-thirds the height of the mirror frame 28 and creates overlap when the mirror panel 30 is folded down onto the upper base 42, with the upper one-third of the viewing mirror 26 remaining exposed, as is shown in FIG. 4. However when the upper base 42 is made to slide to its rearward position along the pivot bolt 36 riding in the pivot groove 38, and relative to the lower base 40, the entire face of the mirror panel 30 is then protected by the lower base 40, as is shown in FIG. 5. The dimensions of a portable wide-view mirror apparatus are not limited to those just stated above. Larger or smaller wide-view mirrors are deemed to be alternate embodiments of this invention. Somewhat varying dimensions may also be required for wide-view mirrors suitable for passenger vehicles and for other manufacturers of truck-tractors.

FIG. 3 is a side view of the mirror apparatus with the mirror panel 30 opened into the viewing position. This is the configuration the mirror would be in when used for right blind-side backing maneuvers by the driver. When the backing maneuvers are complete, the mirror panel 30 would be folded down and the mirror would take on the configuration of FIG. 4.

FIG. 4 is a side view of the mirror apparatus in the on-dash position. This is how the mirror apparatus looks when the driver has finished using the mirror apparatus for a right blind-side backing maneuver and has folded the mirror panel 30 down. The mirror apparatus may be left in this position until needed again. It is apparent that the dimensional difference between the height of the mirror panel 30 and the depth of the base creates overlap when the mirror panel 30 is folded down onto the base, with the upper one-third of the mirror panel 30 extending beyond the base. However directional arrows indicate how the mirror panel 30 and upper base may slide over the lower base to reach the configuration in FIG. 5. As in FIG. 5, the mirror is out of the way in this configuration.

FIG. 5 is a side view of the mirror apparatus in the storage or travel position. In this position the mirror surface is fully protected from damage. This is the configuration the mirror apparatus would be in if the driver were carrying the mirror to another commercial truck. This could also be the position of the mirror apparatus when the mirror apparatus is stored on the dash of the truck or placed out of the way, such as in a storage compartment or under the seat.

FIGS. 3, 4 and 5 may be viewed in succession to get an idea of how the mirror apparatus is folded down for travel or for storage. FIGS. 3, 4 and 5 may be viewed in reverse order to get an idea of how the mirror apparatus is opened up for use.

FIG. 6 presents an alternate view of the preferred embodiment shown in a pivoted position. The mirror apparatus 10 is shown with the upper base 42 and attached mirror panel 30, pivoted about the pivot bolt 36 to the left in a clockwise direction over the lower base 40. The viewing mirror 26 displays the driver's view from the mirror apparatus 10 in FIG. 7 during the right blind-side backing maneuver being performed in FIG. 7. This view shows that the driver can clearly see the right blind-side of his semi-trailer and he can also see the front of the parked semi-trailer 44 next to which he is attempting to park his semi-trailer. The mirror view 26 also reveals that there is sufficient clearance between the driver's semi-trailer and the parked semi-trailer 44, to continue the backing maneuver.

FIG. 7 is an aerial view of a semi-tractor trailer unit 12 performing a right blind-side backing maneuver into an open spot in a row of parked semi-trailers in tight quarters. This is a truck driver's most often encounter with right blind-side backing maneuvers, with a possible occurrence every night at truck stops or anytime a truck driver stops someplace while on the road. The mirror apparatus 10 is located on the passenger side of the dashboard of the semi-tractor 14. As is clearly shown, the rear half of the right side of the semi-trailer 18, including the right-rear corner of the semi-trailer 22, and the parked semi-trailer 44 next to which the driver 16 is attempting to park are clearly within the angle of rearward view 20 provided by the mirror apparatus 10. The driver's 16 direct line of sight 24 out the passenger side window of the semi-tractor 14 clearly shows that the driver 16 cannot directly see any portion of the right side of the trailer 18 or any obstacles it is approaching, including the already parked semi-trailer 44 next to which the driver 16 is attempting to park his semi-trailer 18. It is clear that without the mirror apparatus 10 on the dashboard of the semi-tractor 14 to redirect the driver's 16 line of sight 24 correctly to see the trailer 18 and the parked semi-trailer 44 next to which the driver 16 is attempting to park, the driver would be backing "blind" while performing this right blind-side backing maneuver. By use of the mirror apparatus 10, the driver 16 is no longer backing "blind", and is able to remain sitting in the driver's seat during the backing maneuver. As the backing maneuver progresses, the mirror apparatus 10 may need to be rotated slightly on the dash by the driver 16 so he can see both the semi-trailer 18 and the parked semi-trailer 44 next to which he is attempting to park. To accomplish the repositioning of the mirror, all the driver must do is stop the truck, lean forward slightly, reach up and push or pull slightly on the upper base to pivot the upper base 42 and attached mirror panel 30. The backing maneuver can then be continued until the semi-trailer 18 is securely positioned next to the parked semi-trailer 44. Once the semi-trailer 18 is parked, the mirror apparatus 10 will not be needed for leaving the truck stop, so the mirror panel 30 may be folded down into the on-dash position as shown in FIG. 4.

The embodiment of the present invention shown and discussed is by way of illustration and not of limitation, and a wide variety of equivalent embodiments may be made without departing from the spirit or scope of the invention.

What is claimed is:

1. A wide-view mirror apparatus for right blind-side backing of a vehicle with attached trailer, comprising:

a wide size-ably appropriate image reflecting means by which the driver of a vehicle with an attached trailer can view the rear half of the right blind-side of said trailer, when said image reflecting means is properly positioned within the passenger compartment to provide a wide-angle rearward view out of the passenger side window, for performing a right blind-side backing maneuver;

a support means attached to said image reflecting means by which said image reflecting means is held in a steady viewing position;

a positioning means attached to said image reflecting means by which said image reflecting means viewing angle may be easily adjusted up or down by the driver, around a first axis of adjustment, to provide the necessary view when in use, and by which said image reflecting means may be folded out of the way into a storage position when not in use; and, wherein said positioning means also provides pivotal adjustment of said image reflecting means viewing angle around a second axis perpendicular to said first axis of adjustment; and, including an attachment means to secure said support means to the interior of said passenger compartment; and, including a leveling means attached to said support means to accommodate uneven interior surfaces.

2. A portable wide-view mirror apparatus for right blind-side backing of a vehicle with attached trailer, comprising:

a planar viewing mirror and a mirror frame including a top edge, a bottom edge, a front recessed inner surface sized to accommodate said mirror to which said mirror is fixedly attached, and including an outer edge surrounding said recessed inner surface, wherein said planar viewing mirror and mirror frame are sized to provide the driver with a wide-angle rearward view, out the passenger side window, of the rear half of the right blind-side of the trailer, when said planar viewing mirror is properly positioned on the passenger side of the dashboard within the passenger compartment of said vehicle;

a base including a top surface, a bottom surface, a front edge and a rear edge, hingedly attached along said rear edge to the bottom edge of said mirror frame, wherein said mirror frame and attached planar viewing mirror may be folded down flat onto said base for storage;

wherein said attaching hinge is of a friction type wherein said mirror frame and attached planar viewing mirror may be opened up and supported securely by said base and friction hinge at any appropriate angle for viewing; and, wherein said upper base is pivotally and slide-ably attached to said lower base by a centrally located pivot bolt which extends downwards through a pivot groove in said upper base and is fixedly attached to said lower base, said pivot groove extending from interior of the front edge to interior of the rear edge of said upper base, being centrally located between the left and right side edges of said upper base; and, wherein said upper base and attached mirror and mirror frame may pivot around said pivot bolt as said bottom surface of said upper base slides circularly over said top surface of said lower base, and, wherein the pivoting of said upper base and attached mirror and mirror frame circularly on said lower base is necessary for adjustment of the driver's view while backing; and, wherein said upper base and attached mirror and mirror frame may slide forwards and backwards past said pivot bolt for the length of said pivot groove, as said bottom surface of said upper base slides linearly over said top surface of said lower base; and, wherein the sliding of said upper base and attached mirror and mirror frame linearly on said lower base is necessary to provide clearance for sloping windshields.

3. The mirror apparatus according to claim 2, wherein the lower base has attached from its bottom surface adjustable legs near each rear corner to accommodate sloping dashboards.

4. The mirror apparatus according to claim 2, wherein provision is made for said bottom surface of said base and top surface of said dashboard to have attached to them a hook-loop fastening material to allow quick attachment and removal of said mirror apparatus from said dashboard.

5. The mirror apparatus according to claim 2, wherein the lower base has attached from its bottom surface adjustable legs near each rear corner to accommodate sloping dashboards; and, wherein provision is made for said bottom surface of said base and top surface of said dashboard to have attached to them a hook-loop fastening material to allow quick attachment and removal of said mirror apparatus from said dashboard.

* * * * *